Aug. 5, 1969  C. R. STRUCK ET AL  3,459,060
VARIABLE SPEED TRANSMISSION WITH INTERMITTENT OUTPUT
Filed Nov. 27, 1967

INVENTORS:
CHARLES R. STRUCK
DONALD R. ANDERSON

Aug. 5, 1969  C. R. STRUCK ET AL  3,459,060

VARIABLE SPEED TRANSMISSION WITH INTERMITTENT OUTPUT

Filed Nov. 27, 1967  5 Sheets-Sheet 2

INVENTORS:
CHARLES R. STRUCK
DONALD R. ANDERSON

INVENTORS:
CHARLES R. STRUCK
By DONALD R. ANDERSON

INVENTOR.
CHARLES R. STRUCK
DONALD R. ANDERSON
ATTORNEYS

United States Patent Office 3,459,060
Patented Aug. 5, 1969

3,459,060
VARIABLE SPEED TRANSMISSION WITH INTERMITTENT OUTPUT
Charles R. Struck and Donald R. Anderson, Santa Barbara, Calif., assignors to Houdaille Industries, Inc., Buffalo, N.Y., a corporation of Michigan
Continuation-in-part of application Ser. No. 526,190, Feb. 9, 1966. This application Nov. 27, 1967, Ser. No. 691,097
Int. Cl. F16d *13/00*
U.S. Cl. 74—125.5          21 Claims

ABSTRACT OF THE DISCLOSURE

A variable speed step-down transmission including a rotary driving member, an axially aligned rotary driven member axially adjacent the driving member, both members presenting clutching surfaces of the same diameter and a helical clutch spring spanning the two members and surrounding both of the clutching surfaces. One end of the spring is secured to the driving member for joint rotation. The other end projects outwardly of the coils of the spring such that when it is urged inwardly the coils are contracted slightly to bind against both clutching surfaces and connect the two rotary members for joint rotation. A cam follower member formed integrally with the other end of the spring or otherwise rotates with the spring. A cam member surrounds the spring and is movable into the path of travel of the cam follower member as the spring rotates in selectively adjustable angular portions of each revolution of the spring to drivingly connect and disconnect the driving member and the driven member.

Cross-references to related applications

This a continuation-in-part of our pending application Ser. No. 526,190 filed Feb. 9, 1966 now abandoned, and bearing the same title as this application.

Background of the invention

This invention relates generally to step-down transmissions and more particularly to a transmission employing a spring clutch actuatable to drivingly connect a rotary driving member and a rotary driven member during selectively variable portions of each revolution of the driving member.

Intermittent transmissions of the prior art frequently include interengaging sliding parts which ordinarily result in frictional wear and may also include meshing gears, chain and sprocket connections, ratchet and pawl mechanisms and the like which are subject to wear and which may give rise to undesirable operating characteristics such as noise, chattering and the like.

Summary of the invention

The variable speed transmission comprising the present invention is primarily designed for use in connection with the application of driving torque to the input shaft of a machine, apparatus, or other instrumentality which is capable of performing useful work, when intermittent motion of such instumentality is permissible or desired. The invention is particularly useful when employed as a prime mover for slow-moving machinery which is driven by gearing, such, for example, as a gear reduction device. The variable speed transmission of the present invention is essentially a step-down transmission and is capable of effectively translating the rotational speed of its input shaft into rotational speed of its output shaft by means of infinite incremental adjustments which will allow a downward adjustment of the speed ratio from full input speed of the output shaft to approximately 10% of such input speed. Moreover, the ratio of power input to power output is constant at all speed ratio adjustments of the transmission.

In carrying out the invention, there is provided a centripetal type clutch in which the helical spring thereof is normally free floating on the output shaft of the transmission and has associated with it novel means for shrinking the spring into binding engagement with the output shaft during a predetermined fraction of each spring revolution and then allowing the spring to return to its free floating state during the remainder of such revolution. The output shaft of the transmission is thus caused to rotate at full input speed intermittently and with full input torque the involved over-all gear reduction ratio being a direct function of the selected fraction during which the helical clutch spring makes binding engagement with the output shaft. To determine the particular fraction for spring engagement or binding, a flexible cam is provided and it is designed for engagement with a radially turned end section of the spring. By appropriately altering the contour of the flexible cam, the duration of spring binding for each rotation of the spring may be regulated. The provision of a variable speed transmission of the aforementioned character constitutes the principal object of the present invention.

It is a further object of the invention to provide, in a transmission of the character briefly outlined above, a simple and convenient means for altering the contour of the flexible control cam, such means in the preferred form of the invention involving merely a manual rotation of the accessible outer transmission casing. In a modified form of the invention, the contour-altering means of the transmission comprises a manually rotatable adjustment screw, this latter or modified form of the invention being adaptable for use in instances where it is not convenient or possible to rotate the transmission casing.

The present invention is possessed of numerous advantages, principal among which is the almost entire elimination of interengaging sliding parts which ordinarily result in frictional wear and include meshing gears, chain and sprocket connections, ratchet and pawl mechanisms, and the like. The only sliding parts so far as the present transmission is concerned are the flexible cam and the end of the helical clutch spring which makes substantially sliding point contact with the cam. Noise, is therefore, kept to a minimum and there is little or no heat generation, while at the same time lubrication problems are greatly simplified. The elimination of friction is further enhanced by reason of the fact that during such time as there is a power train from the input shaft to the output shaft of the transmission, such power train delivers full input torque to the output shaft at a one-to-one gear ratio. During such time, the transmission is in a completely "locked up" condition and there are no relatively moving parts whatsoever. Gear reduction is attained not by a stepdown power train, but rather by a fractional "locking up" of the transmission during a selected portion of each 360° rotation of the input shaft.

The designation of the present transmission as a variable speed transmission, therefore, does not imply that at any time the output shaft rotates at a lesser rate of speed than does the input shaft. The designation is intended to imply that over any given prolonged period of operation the accumulated number of output shaft revolutions may differ from the accumulated number of input shaft revolutions, the difference, if any, always being the result of fewer output revolutions than input revolutions.

The provision of a variable speed transmission which is of an extremely simple nature and, therefore, may be manufactured at a low cost; one which is comprised of a minimum number of parts, particularly relatively moving parts, and, therefore, is unlikely to get out of order; one which is capable of ease of assembly and dismantlement for purposes of inspection, replacement, or repair of parts; one which is smooth and silent in its operation; and one which, otherwise, is well adapted to perform the services required of it, are further desirable features which have been borne in mind in the development and production of the present invention.

Other objects and advantages of the invention, not at this time enumerated, will readily suggest themselves as the nature of the invention is better understood from a consideration of the following detailed description.

In the accompanying five sheets of drawings forming a part of this specification, three illustrative embodiments of the invention are shown.

Description of the preferred embodiments

Figure 1:
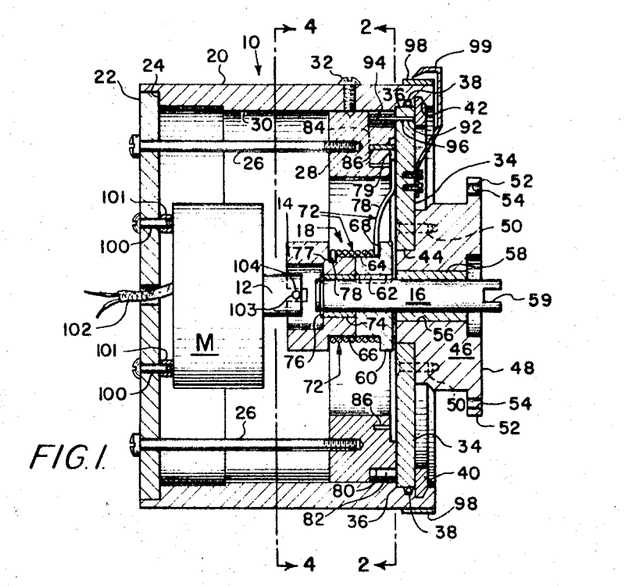
FIG. 1 is a vertical sectional view taken substantially centrally and longitudinally through a variable speed transmission embodying the principles of the present invention.
Figure 2:
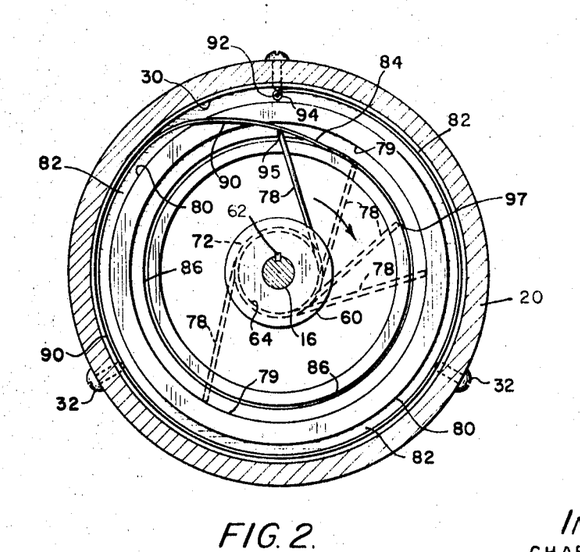
FIG. 2 is a transverse sectional view taken on the line 2—2 of FIG. 1.
Figure 3:
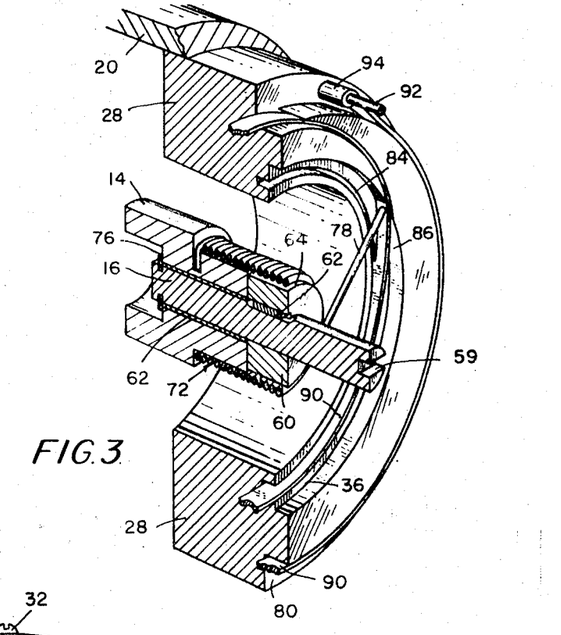
FIG. 3 is a fragmentary perspective view of the transmission, the view being in central longitudinal section.

Referring now to the drawings in detail and in particular to FIGS. 1 and 2, the variable speed transmission of the present invention, in the preferred form thereof, is shown as being embodied in a compact programming device or unitary power unit 10 having an internal or encased driving motor M, the drive shaft 12 of which is operatively connected to an input hub 14 of the transmission proper in driving relationship. The input hub 14 rotates freely upon the output shaft 16 of the transmission but is capable of being periodically clutched thereto in driving relationship by a centripetal type clutch 18, such clutch being effective during a predetermined and limited portion of each hub revolution to lock the output shaft 16 to the driving hub in direct driving relationship, all in a manner that will be made clear presently.

Figure 4:
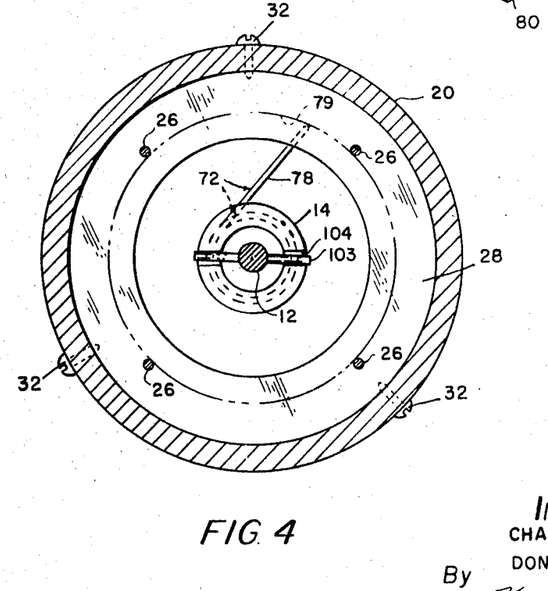
FIG. 4 is a sectional view taken on the line 4—4 of FIG. 1.

The power unit 10 involves in its general organization an open-ended cylindrical outer casing 20 which is positioned so that its axis extends horizontally. The rear end of the casing is closed by a circular end plate 22 which seats within an annular recess 24 in the circular rear rim of said casing. The end plate 22 is held in position by elongated horizontally extending fastening screws 26 (see FIGS. 1 and 4) the rear ends of which are threadedly reclined in sockets in the end plate and the front ends of which are threadedly received in sockets by a cam race ring 28. The latter fits against the inner cylindrical wall surface 30 of the casing 20 and is held in position by screws 32.

The casing 20 is capable of limited angular turning movement about its central horizontal axis for purposes of cam adjustment as will be described presently, and the front end thereof is closed by means of a circular nonrotatable reaction end plate 34. Such plate 34 seats against an internal forwardly facing shoulder 36 on the front end of the casing 20 and said casing is yieldingly held against involuntary angular turning movement and in any selected angular position of adjustment by means of a set screw (not shown). An O-ring 38 snugly surrounds the periphery of the end plate 34 and is disposed in an inwardly facing annular groove 39 in the front end of the casing 20. Such O-ring forms a seal and assists the aforementioned set screw in holding the casing 20 in its various adjusted positions. A split retaining snap ring 40 is removably seated within an inwardly facing annular groove 42 in the front end of the casing, and this ring is located forwards of the O-ring 38 and serves, in combination with the shoulder 36, to confine the end plate 34 against axial shifting movement with respect to the casing 20.

Still referring to FIGS. 1 and 2, the end plate 34 has formed therein a central circular opening 44 and a fixed bolting hub 46 has at its rear end a circular pilot boss 48 which projects into this opening. Fastening screws 50 project through the end plate 34 and have their ends threadedly received in the bolting hub 46, thus fixedly securing the hub in a centered position on the end plate 34. The bolting hub 46 is provided with an outwardly and radially extending circular bolting flange 52 having formed therein an annular series of bolting holes 54 by means of which the hub may be secured by bolts (not shown) to a mating bolting flange on the particular load mechanism which is adapted to be driven by the power unit 10. The output shaft 16 of the transmission projects completely through a central bore 56 in the hub 46 and is centered in this bore by means of a cylindrical antifriction bushing 58. The forward or front end of the output shaft 16 is bifurcated as indicated at 59 in order to provide a suitable power take-off for the shaft 16.

Rearwardly of the end plate 34, the output shaft 16 carries a driven clutch collar 60 which is fixedly secured thereto by way of a key 62 and provides a cylindrical clutch surface 64, the latter being coaxial with a similar clutch surface 66 on the input hub 14. Opposed radial shoulders 68 and 70 on the clutch collar 60 and the input hub 14 respectively serve to confine therebetween a helical clutch spring 72 which surrounds both clutch surfaces 64 and 66. The input hub 14 is rotatably mounted on the rear end of the output shaft 16 by means of a cylindrical antifriction bushing 74, and is retained on said rear end of the output shaft 16 by a snap ring 76.

The rear end of the helical clutch spring 72 is turned inwardly as indicated at 77 and may, if desired, extend into a small radially extending socket in the input hub 14 so that it is fixedly anchored to the hub. Instead of extending into a small radially extending socket in the input hub 14, the inturned rear end of the clutch spring 72 may rest directly on the periphery of the hub to the end that it will create enough tension or pressure on the hub to cause the spring as a whole to move with the hub when in power motion and also to permit back-up of the spring in connection with adjustment of the hereafter mentioned cam strip. The other or front end of the helical clutch spring 72 is turned laterally outwardly and provides, in effect, a cam follower arm 78, the distal or outer end of which normally travels in circumferential fashion in a narrow annulus 79 which exists between the forward end face of the cam race ring 28 and the rear face of the end plate 34.

Figure 5:
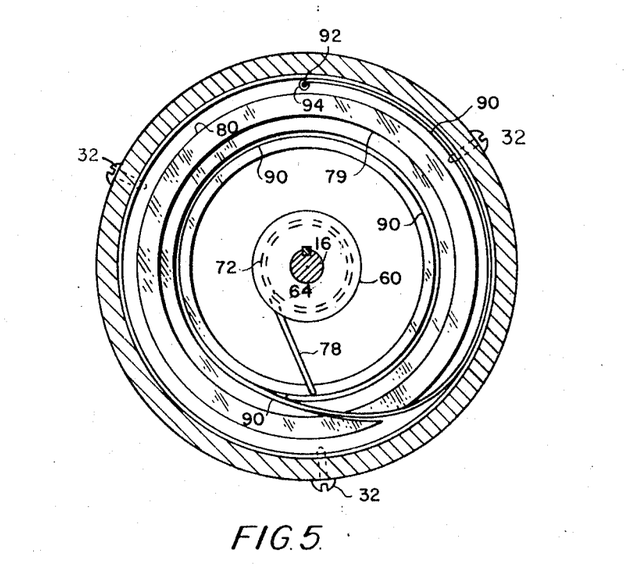
FIG. 5 is a sectional view similar to FIG. 2 but showing the transmission adjusted for a one-to-one ratio drive.
Figure 6:
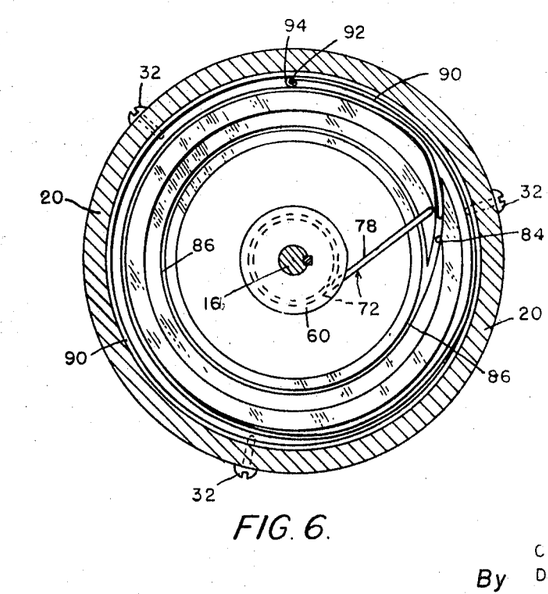
FIG. 6 is a sectional view similar to FIGS. 2 and 5 but showing the transmission adjusted for output stall.

The cam race ring 28 is provided with a peripheral recess 80 which, in combination with the inner cylindrical surface 30 of the outer casing 20, establishes an outer annular cam race 82. This outer cam race communicates through a short curved involute intermediate cam race 84 with an inner annular cam race 86 in the form of a forwardly opening narrow slot which is formed in the cam race ring 28. An elongated flexible cam strip 90 of predetermined length has one end thereof secured within the outer annular cam race 82 by means of a pin 92 which projects through a loop 94 in said one end of the cam strip, the pin projecting into a socket 96 (see FIG. 1) in the end plate 34. The flexible cam strip 90 is preferably in the form of an elongated strip of flat flexible spring stock or length of link chain such as bicycle chain or the like of a width somewhat greater than the depth of the inner annular cam race 86 and this cam strip, in the extreme free non-torque-transmitting adjusted condition of the transmission, extends substantially completely around the outer annular cam race 82 as shown in FIG. 6, and then projects inwardly in involute fashion a slight distance into the involute intermediate cam race 84. In the other extreme torque-transmitting condition of the transmission, the flexible cam strip 90 extends partially around the outer annular cam race 82 as shown in FIG. 5 and then passes completely through the involute intermediate cam race 84 and into the inner annular cam race 86 and extends completely around this latter cam race. When so disposed in the inner annular cam race 86, one edge region of the flexible cam strip 90 overhangs the inner side wall of the slot which defines the inner annular cam race 86 and extends into the path of movement of the distal end of the cam follower arm 78 which normally rides within the aforementioned annulus 79.

Figure 9:
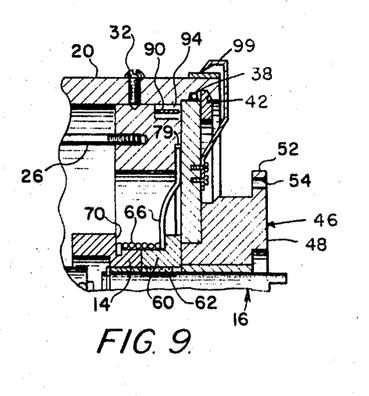
FIG. 9 is a fragmentary sectional view of a portion of the transmission of FIG. 1 but with the parts in the position which they assume when the transmission is in a free-floating condition of output stall.

In the selected intermediate torque-transmitting condition of the transmission as shown in FIG. 1, the flexible cam strip 90 extends partially around the outer annular cam race 82 and then passes completely through the involute intermediate cam race 84 and projects a predetermined distance around the inner annular cam race 86 so that the cam strip terminates within this inner cam race, the point of termination being indicated at 97 in FIG. 2. In this condition of the transmission, the limited portion of the cam strip which is disposed within the inner annular cam race 86 overhangs the inner side wall of the cam race as clearly shown in FIG. 1 so that once during each revolution of the cam follower arm 78, this arm is constrained to ride inwardly on the involute section of the cam strip 84 and thereafter to ride upon such portion of the cam strip as is disposed within the inner annular cam race 86 until such time as the outer or distal end of the cam follower arm 78 passes beyond the arcuate reach of the exible cam strip 90, whereupon the flexible follower arm 78 will ride off the end 97 of the cam strip and snap back, so to speak, into its normal position within the annulus 79 and assume the position wherein it is shown in FIG. 9. The duration of contact between the distal end of the cam follower arm 78 and the flexible cam strip 90 during each rotation of the former determines the duration of torque-transmission from the input hub 14 to the output shaft 16 as will be described presently.

The coaxial cylindrical clutch surfaces 64 and 66 on the driven clutch collar 60 and the input hub 14 respectively are preferably of equal diameter, this diameter being very slightly less than the normal inside diameter of the helical portion of the clutch spring 72 when the latter is in its free or unrestrained state. Instead of the clutch surfaces 64 and 66 being of equal diameter, the clutch surface 64 may be of slightly smaller diameter than the clutch surface 66. Because of the inturned rear end of the clutch spring, the spring will at all times rotate with the input hub 14, but it will ride free of the driven clutch collar 60 at such time as the cam follower arm 78 is in its free state within the annulus 79 and is out of engagement with the flexible cam strip 90. At such time as the distal end of the cam follower arm 78 encounters such portion of the flexible cam strip 90 as may be projected into the involute intermediate cam race 84 and lie within the cylindrical confines of the annulus 79, or such portion of the cam strip as may be disposed within the inner annular cam race 86, the cam follower arm 78 will be deflected in a trailing direction as shown variously in dotted lines in FIG. 2, thus causing the portion of the helical spring clutch which encircles the cylindrical clutch surface 64 of the driven clutch collar 60 to contract in centripetal fashion on this clutch surface and bind the spring 72 to the clutch collar 60 for rotation in unison therewith.

Selective interpositioning of the cam strip 90 within the intermediate cam race 84 and within the inner annular cam race is attained by manual rotation of the outer casing 20. Inasmuch as one end of the flexible cam strip 90 is anchored on the fixed pin 92 in the upper region of the end plate 34, manual rotation or angular turning movement of the casing 20 in a clockwise direction as viewed in FIG. 2 will progressively withdraw whatever portion of the cam strip 90 projects through the intermediate cam race 84 and into the inner annular cam race 86 and return the same to the outer annular cam race 82. At the limit of such clockwise turning movement, only a small portion of the end region of the flexible cam strip 90 will remain within the intermediate cam race 84 as shown in FIG. 6. This small portion of the cam strip does not project radially inwardly of the casing 20 a sufficient distance to interfere with the normal free revolution of the distal end of the cam follower arm 78 within the annulus 79. Said cam follower arm will, therefore, rotate unobstructedly and continuously sweep around the annulus 79. The follower arm 78, being thus unrestrained, will have no binding influence on the helical portion of the clutch spring and no torque will be transmitted to the clutch surface 64. The output shaft 16 will thus remain stalled. FIG. 6 thus is illustrative of the condition of the transmission when no torque is transmitted from the input hub 14 to the output shaft 16.

FIG. 5 is illustrative of the condition of the variable speed transmission when a one-to-one gear ratio drive is in effect. This condition is attained by manually rotating or angularly turning the outer casing 20 in a counterclockwise direction to the fullest extent of which it is capable of being turned during such turning movement, the pin 92 serves as a reaction member to prevent circumferential shifting of the entire flexible cam strip 90 as a whole within the outer annular cam race 82 so that the free end region of the cam strip 90 will be forced endwise through the involute intermediate cam race 84 and into the inner annular cam race 86. Such continued counterclockwise rotation or angular turning movement of the outer casing 20 will ultimately feed the cam strip endwise completely around the inner annular cam race 86 throughout an arc of 360° and establish a slight overlap where the distal end of the flexible cam strip 90 attempts again to enter the involute intermediate cam race 84. Since the flexible cam strip 90 is now coextensive with the inner annular cam race and overhang the inner wall thereof, it projects across the annulus 79 throughout the entire 360° extend of the latter. The outer or distal end of the flexible cam follower arm 78 will, therefore, during revolution thereof, make full sweeping contact with the overhanging portion of the flexible cam strip 90 and describe a perfect circle during each revolution. At the same time, the convolutions of the helical portion of the spring 72 will be shrunk upon the clutch surface 64 so that a direct drive from the input hub 14 to the driven clutch collar 60 will take place through the medium of the helical clutch spring 72. Since there is no interruption to the binding action of the spring 72, the collar 60, and, consequently, the output shaft 16, which is keyed thereto, will rotate continuously.

FIG. 2 is ilustrative of the condition of the variable speed transmission when a step-down gear ratio of approximately three to one is prevalent. While there may be a slight lag between the time that the outer or distal end of the cam follower arm 78 initially engages the portion of the flexible cam strip 90 which projects through the involute intermediate cam race 84 and the time that the helical spring clutch is sufficiently shrunk that it will seize the adjacent cam surface, the necessary shrinkage will nevertheless take place at some point between the initial point 95 of engagement (see FIG. 2) and the point 97 of departure from the flexible cam strip 90. The over-all length of the flexible cam strip 90 is originally calculated according to engineering expediencies and is thus related to the various radii that are involved in manufacturing the various transmission parts. An indicating strip 58 which surrounds the casing 20 cooperates with a fixed pointer 99 on the end plate 34 and serves at all times to indicate the effective gear ratio for which the transmission is adjusted.

While the input hub 14 may be operatively connected to a detached or remote rotary drive shaft, in the exemplary form of the variable speed transmission that is illustrated herein, the transmission constitutes a part of the power unit 10 and the drive motor M for the input hub 14 is contained within the confines of the casing. Fastening screws 100 and spacer collar 101 serve to secure the motor M to the rear circular end plate 22, while flexible lead-in wires 102 supply electric current for energizing the motor. The motor M is thus rigidly mounted on the end plate 22. A driving connection is established between the motor shaft 12 and the input hub 14 by means of a drive pin 103 which extends through and fits snugly in a transverse bore in the shaft. The end portions of the drive pin project beyond the periphery of the motor drive shaft 12 and slots 104 in the cylindrical wall of the generally cup-shaped input hub 14.

Figure 7:
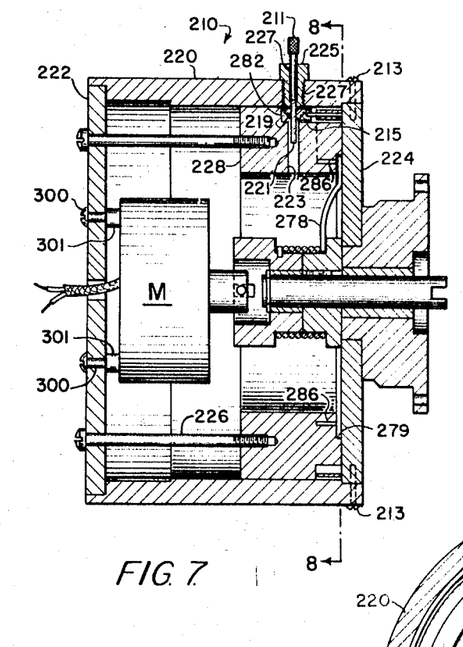
FIG. 7 is a sectional view similar to FIG. 1 and taken substantially centrally and longitudinally through a modified form of variable speed transmission embodying the principles of the present invention.
Figure 8:
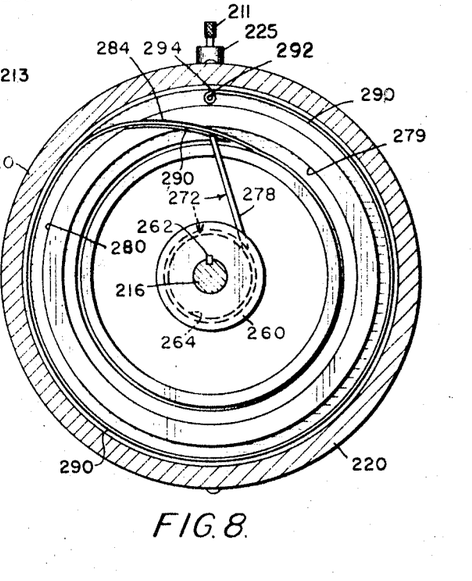
FIG. 8 is a transverse sectional view on the line 8—8 of FIG. 7.

Under certain circumstances, it may be impractical to effect rotation of the casing 20 of the power unit 10 and, therefore, in the modified form of power unit 210 shown in FIGS. 7 and 8, the transmission is designed for adjustment under the control of a knurled adjustment screw 211, utilizing a fixed or non-rotatable casing 220 and end plates 222 and 234. Because of the similarity of the power unit 210 to the previously described power unit 10, and in order to avoid needless repetition of description, similar reference numerals but of a higher order have been applied to the corresponding parts as between the disclosures of FIGS. 1 and 2 on the one hand and FIGS. 7 and 8 on the other hand.

In the form of the invention shown in FIGS. 7 and 8, the end plate 234 is fixedly secured to the cylindrical casing 220 by means of fastening screws 213 so that there will be no relative rotation between these two parts. The flexible cam strip 290, instead of being pinned to the end plate 234, is independently shiftable endwise in opposite directions with respect to this plate, as well as with respect to the cam race ring 228 which, being fixedly secured to the nonrotatable casing 220, is itself nonrotatable. The flexible cam strip 290 is thus shiftable under the control of a bevel ring gear 215 which is confined and rides within the outer annular cam race 282, the flexible cam strip having one end thereof fixedly secured to this ring gear only in the end region of the strip. The remainder of the strip is free of the ring gear and thus capable of progressing from the outer annular cam race 282, through the involute intermediate cam race 284 to the inner annular cam race 286 in the manner previously described in connection with the form of transmission shown in FIGS. 1 and 2. The bevel gear 215 meshes with a small bevel gear 219 which is telescopically received over a square shaft section 221. The latter depends below the adjusting screw 211 and extends into a clearance bore 223 in the cam race ring 228. The knurled adjusting screw 211 is threadedly received through a mounting nipple 225 which, in turn, is threadedly received in a threaded bore 227 in the casing 220. Instead of shifting the flexible cam strip 290 by way of the bevel ring gear 215 and the bevel gear 219, a chain and sprocket connection (not shown) may be employed.

From the above description, it will be apparent that the variable speed transmission that is associated with the power unit 210 may be adjusted for any desired intermittent output drive ranging from a continuous uninterrupted one-to-one ratio drive when the adjusting screw is positioned to withdraw the flexible cam strip 290 from the inner annular cam race 286 and from a major portion of the involute intermediate cam race 284 and project the same largely in the outer annular cam race 282, to a condition of output stall when the adjusting screw is positioned to project the flexible cam strip into the inner cam race 286 so that the strip establishes a complete and closed circular loop within this latter cam race similar to the loop which is established by the flexible cam strip 90 as shown in FIG. 6. Except for the fact that the flexible cam strip 290 is independently shiftable bodily and endwise in opposite directions for selective proportional distribution of its length in the three fixed cam races 282, 284 and 286, instead of being held against endwise shifting movement for projection into or through these cam races by reason of their relative movement with respect to the cam strip as is the case in the previously described form of the invention, the construction and operation of the power unit 220 remains substantially the same as the construction and operation of the power unit 20. Therefore, by considering the flexible cam strip to assume positions relative to the cam races 282, 284 and 286 commensurate with the positions assumed by the cam strip 90 with respect to the cam races 82, 84 and 86 as illustrated in FIGS. 1, 5 and 6, respectively, a determination of the blocking action of the cam strip with respect to the distal end of the cam follower arm 278 will be readily apparent in each instance, such blocking action, of course, establishing the effective gear ratio drive of the transmission as heretofore described.

Figure 10:
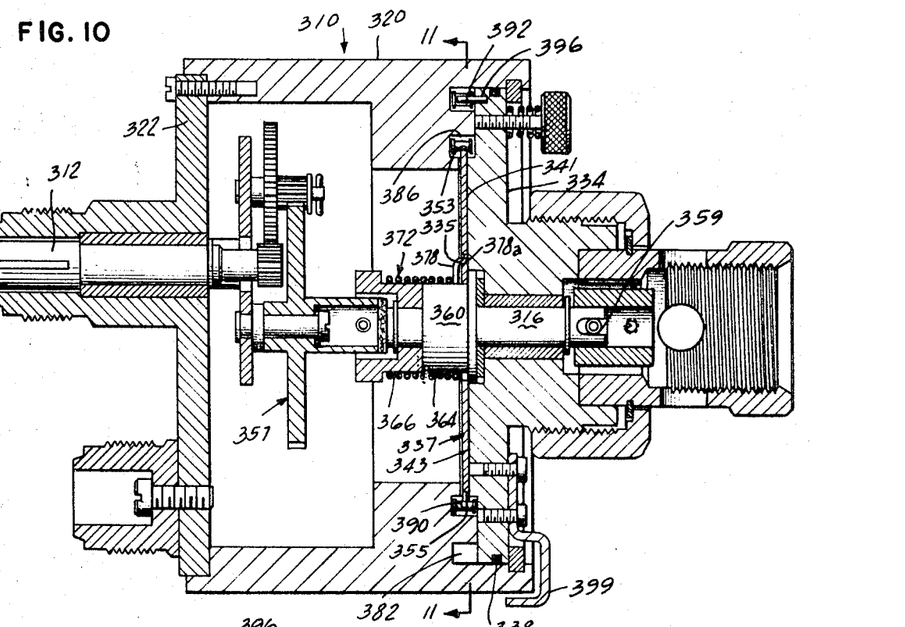
FIG. 10 is a sectional view similar to FIG. 1 showing another form of a variable speed transmission embodying the principles of the present invention.
Figure 11:
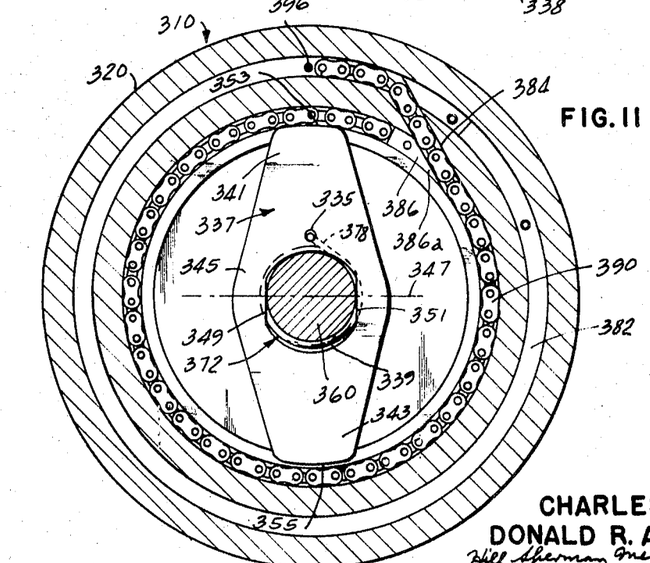
FIG. 11 is a transverse sectional view taken on line 11—11 of FIG. 10.

In the embodiment of the invention shown in FIGS. 10 and 11 in which reference numerals similar to those applied to corresponding parts of the embodiments shown in FIGS. 1–6 and FIGS. 7 and 8 are used but increased to a higher order, the flexible cam strip in the power unit 310 comprises a length of link chain such as bicycle chain or the like as indicated at reference numeral 390 in place of the elongated strip of flat flexible spring stock as indicated at 90 in FIGS. 1–6 and at 290 in FIGS. 7 and 8. One end of the chain 390 is secured within the outer annular cam race 382 by means of a pin 392 which projects into a socket 396 formed in the end plate 334. The length of the chain 390 is sufficient so that in the extreme torque-transmitting condition of the transmission 310, the chain extends partially around the outer annular cam race 382 and then passes completely through the involute intermediate cam race 384 and into the inner annular cam race 386 and extends completely around this latter cam race. The widths of the various cam races are sized with respect to the width of the chain 390 so that the side walls of the races prevent buckling or any substantial foreshortening of the chain.

Another difference between the embodiments shown in FIGS. 10 and 11 and the previously described embodiments resides in the relationship between the flexible cam strip and the front end of the helical clutch spring 372. In the previously described embodiments the ditsal or outer ends 78 and 278 of the spring extends radially outwardly a distance sufficient to engage those portions of the cam strips 90 and 290 which extend into the inner annular cam races 86 tand 286. In the embodiment shown in FIGS. 10 and 11, however, the distal end 378 of the spring 372 does not extend to the inner cam race 386 but instead extends only a short distance laterally outwardly of the coils of the spring to terminate at an axially outturned ear 378a substantially radially inwardly of the inner cam race 386.

The ear 378a is received in a bore 335 formed in a plate 337 which is apertured as at 339 to receive and to be carried on a clutch collar portion 360 of the output shaft 316. In the embodiment illustrated the plate 337, which serves as a cam follower arm, comprises a pair of diametrically opposed lobes 341 and 343 extending from a central portion 345. The plate 337 is asymmetrical about a transverse dividing line 347 between lobes 341 and 343 and the aperture 339 is disposed eccentrically in the plate 337 and is oblong in the direction of the longitudinal axis of plate 337, being formed in part by a pair of straight parallel side walls 349 and 351 spaced a distance approximately equal to the diameter of the clutch collar portion 360.

When the cam follower strip or link chain 390 is disposed entirely within the outer cam race 382 and the intermediate cam race 384, the end portion 378 of the coil spring 372 biases the plate 337 radially so that an outer end wall 353 of lobe 341 extends outwardly beyond an inner side wall 386a of the inner cam race 386, and an outer end wall 355 of lobe 343 is disposed radially inwardly of wall 386a. The plate 337 rotates, of course, with the spring 372, but does not effect binding engagement of the spring with the output shaft 316.

When the casing wall 320 is adjustably rotated relative to the end wall 334, however, the outer end wall 353 of lobe 341 engages that portion of the chain 390 inserted in the inner cam race 386. The plate 337 is movable on the clutch collar portion 360 of the output shaft 316 due to the oblong configuration of the aperture 339, and moves radially upon engagement thereof with chain 390 to move the end portion 378 of the spring 372 radially inwardly toward the coils of the spring to effect a binding engagement between the adjacent clutch surfaces 364 and 366 for joint rotation of the input and output shafts 312 and 316.

It is also noted that in the form of the invention shown in FIGS. 10 and 11 there is no provision for a motor within the power unit 310 as there is in the previously described forms. The input shaft 312 extends through the end plate 322 for connection to a suitable source of power and is drivingly connected within the casing 20 to the input hub 314 through a gear train indicated generally a reference number 357. Of course the gear train 357 can be eliminated if desired for connecting the input shaft 312 directly to the input hub 314.

Although the embodiment illustrated in FIGS. 10 and 11 requires turning of the casing 320 relative to the end wall 334 to effect ingress and egress of the leading end of the chain or cam follower 390 into and out of the inner cam race 386 it should be understood that the arrangement for moving the cam strip shown in FIGS. 7 and 8 utilizing a fixed casing 220 and a bevel ring gear 215 as also applicable to the form of the invention shown in FIGS. 10 and 11.

Considering now the invention in its broadest aspect, it will be observed that in either of the three forms of the step-down transmission illustrated and described herein, the outer cam race 82 constitutes in effect a storage reservoir which normally contains a major portion of the flexible cam strip 90. The intermediate cam race 84 constitutes a feed passage through which portions of the cam strip contained in the reservoir may be progressively fed into the inner cam race 86 for projection into the path of movement of the outer or distal end of the cam follower arm 78. The provision of a circular annular reservoir such as is provided by the outer annular cam race affords a convenient type of reservoir for storing the relatively stiff flexible cam strip 90. However, it is within the purview of the present invention to employ other forms of storage reservoirs for the cam strip or such portions thereof as are not in actual use against the cam follower arm 78, as, for example, a cylindrical storage reservoir within which the flexible cam strip 90 may be coiled in involutely wound fashion.

The invention is not to be limited to the exact arrangement of parts shown and described in the accompanying drawings or described in this specification as various changes in the details of construction may be resorted to without departing from the spirit or scope of the invention. Therefore, only insofar as the invention has particularly been pointed out in the accompanying claims is the same to be limited.

We claim as our invention:

1. In a variable speed step-down transmission, in combination:
   a rotary driving member and a rotary driven member disposed in axial alignment and presenting coaxial cylindrical clutch surfaces,
   a helical clutch spring having a helical portion encompassing said clutch surfaces and secured at one end to one of said members for rotation in unison therewith,
   the other end of the spring projecting outwardly beyond the cylindrical confines of the helical portion and constituting a generally radially extending cam follower arm,
   a ring encircling said one member and defining an annulus into which the distal end of the cam follower arm projects and around which it is adapted to sweep in circumferential fashion upon rotation of the spring,
   a flexible cam strip adapted for progressive portion endwise into and out of said annulus,
   a reservoir for containing the cam strip, and
   means for feeding the cam strip endwise to and from the reservoir into and out of the annulus respectively,
      such portion of the cam strip as enters the annulus being projected into the path of movement of said distal end of the cam follower arm and being engageable therewith for deflecting said cam follower arm in the trailing direction of motion thereof,
   whereby the helical portion of the clutch spring will bind against the clutch surface on the other rotary member and thus connect said members in torque-transmitting relationship.

2. A variable speed step-down transmission as set forth in claim 1 and wherein the helical portion of the clutch spring is secured at one end to the rotary driving member.

3. A variable speed step-down transmission as set forth in claim 1 and wherein the reserveor for the cam strip is in the form of an annular cam race surrounding the annulus.

4. A variable speed step-down transmission as set forth in claim 1 and wherein the reservoir for the cam strip is in the form of an annular cam race surrounding the annulus, said transmission including means defined by said ring establishing an intermediate cam race which communicates generally in tangential fashion with both the annulus and the annular cam race and through which the cam strip is adapted to be passed endwise in moving to and from the annulus.

5. A variable speed step-down transmission as set forth in claim 2 and wherein said ring has formed therein an annular inner cam race, an outer annular cam race, and an intermediate cam race which extends in involute fashion between the inner and outer cam races and establishes communication therebetween, the outer cam race constituting, in effect, the reservoir for the cam strip and the inner cam race constituting, in effect, a guide for the cam strip and by means of which the latter is guided endwise through the annulus.

6. In a variable speed step-down transmission, in combination:
   an outer cylindrical casing,
   an end plate closing the forward end of the casing,
      said casing and end plate being capable of relative angular turning movement with respect to each other and about the central axis of the casing,
   an output member,
   means rotatably journalling said output member in said end plate in coaxial relation with respect to the casing, an input member mounted and freely rotatable on the rear end of the input member and coaxial therewith, a helical clutch spring common to said members and encompassing the same, means connecting the rear end of the clutch spring to the input member in driving relationship, said clutch spring being normally freely rotatable with respect to the output member but being adapted, upon tightening of the convolutions thereof, to shrink upon the output member in binding relationship and thus transmit torque from the input member to the output member, the forward end of said spring projecting outwardly beyond the helical confines of the spring and establishing, in effect, a cam follower arm having an appreciable component of radial direction, a cam race ring surrounding the output member and secured to the casing internally thereof, said ring defining an annulus into which the outer or distal end of the follower arm projects and around which it is adapted to sweep in circumferential fashion upon rotation of the spring, said cam race ring further defining, in combination with the casing and end plate, an inner annular cam race, an outer concentric cam race, and an intermediate cam race which extends between the outer end inner cam races in involute fashion and establishes communication therebetween, an elongated flexible cam strip normally disposed within and coextensive with the outer cam race and a limited portion of the intermediate cam race, means fixedly securing one end of the cam strip to said end plate, said cam strip being shiftable endwise in opposite directions for progressive projection thereof through said intermediate cam race and into and out of the inner cam race, said cam strip, when projected into the inner cam race being disposed in the path of movement of the distal end of the follower arm for engagement thereby and consequent deflection thereof in the trailing direction of motion of the spring thereby to tighten the spring helices in binding relationship upon the output member during engagement of the distal end of the follower arm with the cam strip.

7. A variable speed step-down transmission as set forth in claim 6 and including, additionally, an end plate closing the rear end of the casing, an electric motor fixedly disposed within the casing and having its drive shaft in axial alignment with the input member, and a torque-transmitting coupling operatively connecting the motor shaft and input member in driving relationship.

8. A variable speed step-down transmission as set forth in claim 6 and wherein the inner cam race is in the form of an annular groove formed in said ring and opening into said annulus, and the cam strip is in the form of a length of flat spring stock of a width in excess of the depth of said groove, the cam strip, when disposed within the groove projecting outwardly thereof and into the annulus in the path of movement of the distal end of the follower arm.

9. A variable speed step-down transmission as set forth in claim 6 and wherein the means for rotatably journalling the output member in the end plate includes a fixed bolting hub secured to the end plate and projecting forwardly therefrom and through which the output member projects.

10. A variable speed transmission as set forth in claim 6 and wherein the input member comprises a driving hub freely rotatable upon and supported by the input member, and the input member comprises a rotatable shaft and a driven clutch collar secured thereto, said clutch collar being provided with a cylindrical clutch surface thereon and disposed within the confines of the helical clutch spring.

11. In a variable speed step-down transmission, in combination:

a transmission casing, a rotary driving member and a rotary driven member on said casing disposed in axial alignment and presenting coaxial cylindrical clutch surfaces, a helical clutch spring having a helical portion encompassing said clutch surfaces and secured at one end to one of said members for rotation in unison therewith, the other end of said spring projecting radially of the cylindrical confines of the helical portion and movable from a first position to which said other end is normally biased and at which the spring releases the two members for relative rotation to a second position radially of said first position and at which the spring tightens into binding torque-transmitting engagement with said two members for joint rotation thereof, an adjustable cam member on said casing movable between first and second positions at which the cam member is in the path of travel of said other end of said spring to cam said other end from said first to said second positions thereof during different portions of each revolution of said spring, and means for moving said cam member selectively between said first and second positions thereof for adjusting the angle of each revolution of said spring through which said driven member rotates jointly with said driving member.

12. The transmission as defined in claim 11 wherein said casing comprises:

a casing wall and an end wall relatively movable in opposite directions with respect to said casing wall, and wherein said cam member is operatively connected to said walls for movement between said first and second positions thereof upon relative movement of said walls in said opposite directions.

13. The transmission as defined in claim 11 wherein said cam member comprises an elongated flexible member and including guide means for guiding said flexible member in an endwise direction between said first and second positions thereof.

14. In a variable speed step-down transmission, in combination:

a rotary driving member and a rotary driven member disposed in axial alignment and presenting coaxial cylindrical clutch surfaces, a helical clutch spring having a helical portion encompassing said clutch surfaces and secured at one end to one of said members for rotation in unison therewith, the other end of the spring projecting outwardly beyond the cylindrical confines of the helical portion, a ring defining an annulus around said spring, a flexible cam strip adapted for progressive projection endwise into and out of said annulus, a reservoir for containing the cam strip, means for feeding the cam strip endwise to and from the reservoir into and out of the annulus respectively, and generally radially extending cam follower means connected for joint rotation to said other end of said spring and projecting into said annulus to sweep therearound in circumferential fashion upon rotation of the spring, such portion of the cam strip as enters the annulus being projected into the path of movement of the distal end of the cam follower means and being engageable therewith for deflecting said other end of said spring in the trailing direction of motion thereof whereby the helical portion of the clutch spring will bind against the clutch surface on the other rotary member and thus connect said members in torque-transmitting relationship.

15. The transmission as defined in claim 14 wherein said cam follower means comprises an arm formed integrally with said other end of said spring and extending generally radially therefrom.

16. The transmission as defined in claim 14 wherein said cam follower means comprises a rigid plate member journalled for rotation about the axis of said rotary members and movable radially relative thereto for engagement and disengagement with said cam strip.

17. The transmission as defined in claim 16 wherein said other end of said spring biases said rigid plate member radially outwardly toward said cam strip.

18. The transmission as defined in claim 16 wherein said rigid plate member is journalled for rotation on said driven member and comprises means forming an oblong bore therein which receives said driving member for radial movement relative thereto.

19. The transmission as defined in claim 18 in which said oblong bore is offset with respect to the center of said rigid plate member to provide a pair of diametrically opposed lobes extending different distances from said oblong bore.

20. The transmission as defined in claim 16 wherein said cam strip comprises a link chain.

21. The transmission as defined in claim 16 wherein said cam strip comprises an elongated strip of flat flexible spring stock.

References Cited

UNITED STATES PATENTS

| | | | |
|---|---|---|---|
| 2,021,413 | 11/1935 | Gille | 192—41 |
| 2,614,629 | 10/1952 | Bleibtreu | 192—81 |
| 2,804,778 | 9/1957 | Booth | 74—125.5 |
| 2,883,022 | 4/1959 | Clausing et al. | 192—81 |
| 2,934,009 | 4/1960 | Bach et al. | 192—81 |
| 2,968,380 | 1/1961 | Sacchini et al. | 192—41 |
| 3,125,890 | 3/1964 | Dillon et al. | 74—125.5 |
| 3,253,476 | 5/1966 | Olah | 192—81 |

FRED C. MATTERN, Jr., Primary Examiner

W. S. RATLIFF, Jr., Assistant Examiner

U.S. Cl. X.R.

192—41, 81